United States Patent
William

(10) Patent No.: US 10,684,762 B2
(45) Date of Patent: Jun. 16, 2020

(54) ANALYTICS DESIGN SYSTEM

(71) Applicant: SAP SE, Walldorf (DE)

(72) Inventor: John Alex William, Bengaluru (IN)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 16/113,222

(22) Filed: Aug. 27, 2018

(65) Prior Publication Data
US 2020/0064991 A1    Feb. 27, 2020

(51) Int. Cl.
G06F 3/0484 (2013.01)
G06F 9/54 (2006.01)
G06F 16/26 (2019.01)
G06F 40/14 (2020.01)

(52) U.S. Cl.
CPC ............ G06F 3/04847 (2013.01); G06F 9/54 (2013.01); G06F 16/26 (2019.01); G06F 40/14 (2020.01)

(58) Field of Classification Search
CPC ........ G06F 3/04847; G06F 17/50; G06N 5/02
See application file for complete search history.

(56) References Cited

U.S. PATENT DOCUMENTS

| | | | | |
|---|---|---|---|---|
| 9,336,620 | B2 * | 5/2016 | Gilger | G06Q 10/00 |
| 2002/0199156 | A1 * | 12/2002 | Chess | G05B 23/0267 716/100 |
| 2011/0029853 | A1 * | 2/2011 | Garrity | G06F 11/32 715/215 |
| 2011/0066933 | A1 * | 3/2011 | Ludwig | G06F 17/246 715/212 |
| 2013/0091437 | A1 * | 4/2013 | Ludwig | G06K 9/00355 715/751 |
| 2013/0259353 | A1 * | 10/2013 | Hewett | G06F 19/321 382/132 |
| 2013/0262348 | A1 * | 10/2013 | Kiran | G06Q 50/01 706/11 |
| 2015/0073961 | A1 * | 3/2015 | Cristoforo | G06F 3/04815 705/37 |

OTHER PUBLICATIONS

McCormick et al., "Scout: A Hardware-Accelerated System for Quantitatively Driven Visualization and Analysis" (Year: 2004).*
Klump et al., "An Advanced Visualization Platform for Real-Time Power System Operations" (Year: 2002).*

* cited by examiner

*Primary Examiner* — Phillip H Nguyen
(74) *Attorney, Agent, or Firm* — Schwegman Lundberg & Woessner, P.A.

(57) ABSTRACT

Systems and methods are provided for causing display of a graphical user interface for designing at least one visualization, receiving data defining a first visualization control, receiving a least one data model defining at least one data source related to the first visualization control, and receiving at least one calculation module defining calculation details for the first visualization control. Further, the systems and methods are provided for generating an analytical instance for the at least one visualization comprising the first visualization control, the at least one data model, and the at least one calculation module, and uploading to a server system a specification associated with the analytical instance.

20 Claims, 13 Drawing Sheets

ANALYTICS DESIGN SYSTEM

BACKGROUND

Business data comprises a very large amount of data and can be structured or unstructured. In order to understand hidden patterns or other useful information from such business data, advance visualization is useful. Advance visualization includes customizable information graphics and animations, automated video visualization and interactive dashboards, complex structured visualization formed by multiple visualization controls, streaming analytics data visualization, and so forth. To generate such advanced visualization, however, takes a skilled software developer to develop a control for a specific business need. Moreover, such a control may not be up to the expectation of a business user desiring to use the control who does not have the technical skills to develop a control or advanced visualization.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to an analytical design system for designing and implementing advanced visualization. Example embodiments enable users to create such advanced visualization to address their needs quickly without programming. Moreover, example embodiments allow for creation of templates to be used by business users to create the advance visualization. Example embodiments employ a simplified architecture that is scalable with cutting-edge technologies.

Figure 1:
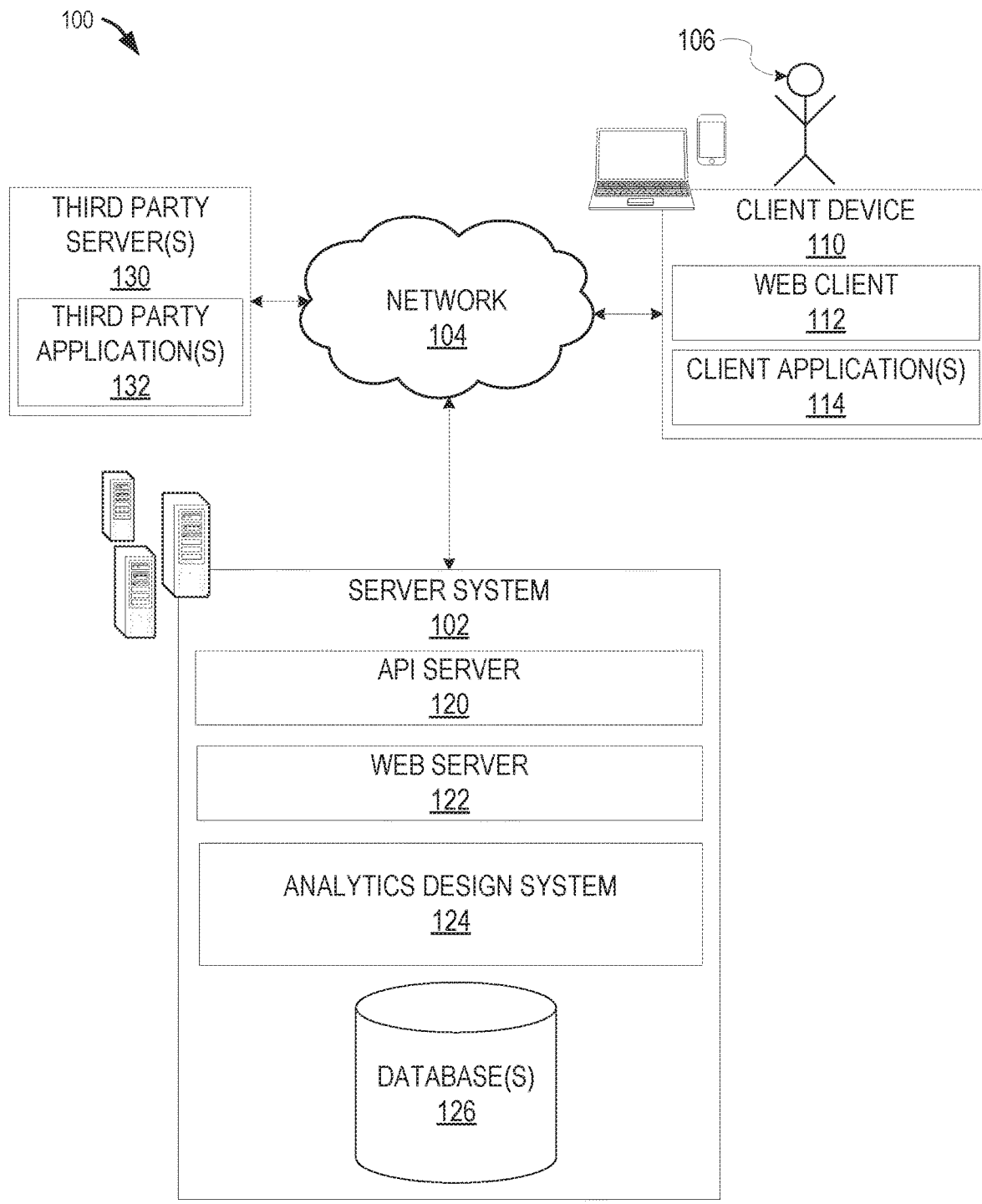
FIG. 1 is a block diagram illustrating a networked system, according to some example embodiments.

FIG. 1 is a block diagram illustrating a networked system 100 configured to design, implement, and execute advance visualizations, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, an enterprise resource planning (ERP) application, a customer relationship management (CRM) application, an analytics design application, an application for displaying and interacting with advance visualizations, and the like.

In some embodiments, one or more client applications 114 may be included in a given one of the client device 110, and configured to locally provide the user interface and at least some of the functionalities, with the client application 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, to authenticate a user 106, to verify a method of payment, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and analytics design system 124 that may be communicatively coupled with one or more databases 126.

The one or more databases 126 may be storage devices that store data related to users of the system 100, applications associated with the system 100, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The analytics design system 124 may provide back-end support for third-party applications 132 and client applications 114, which may include cloud-based applications. The analytics design system 124 processes requests for designing, implementing, and executing advance visualizations, and so forth, as described in further detail below. The analytics design system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide analytics design and viewing functionality that is supported by relevant functionality and data in the server system 102.

Figure 2:
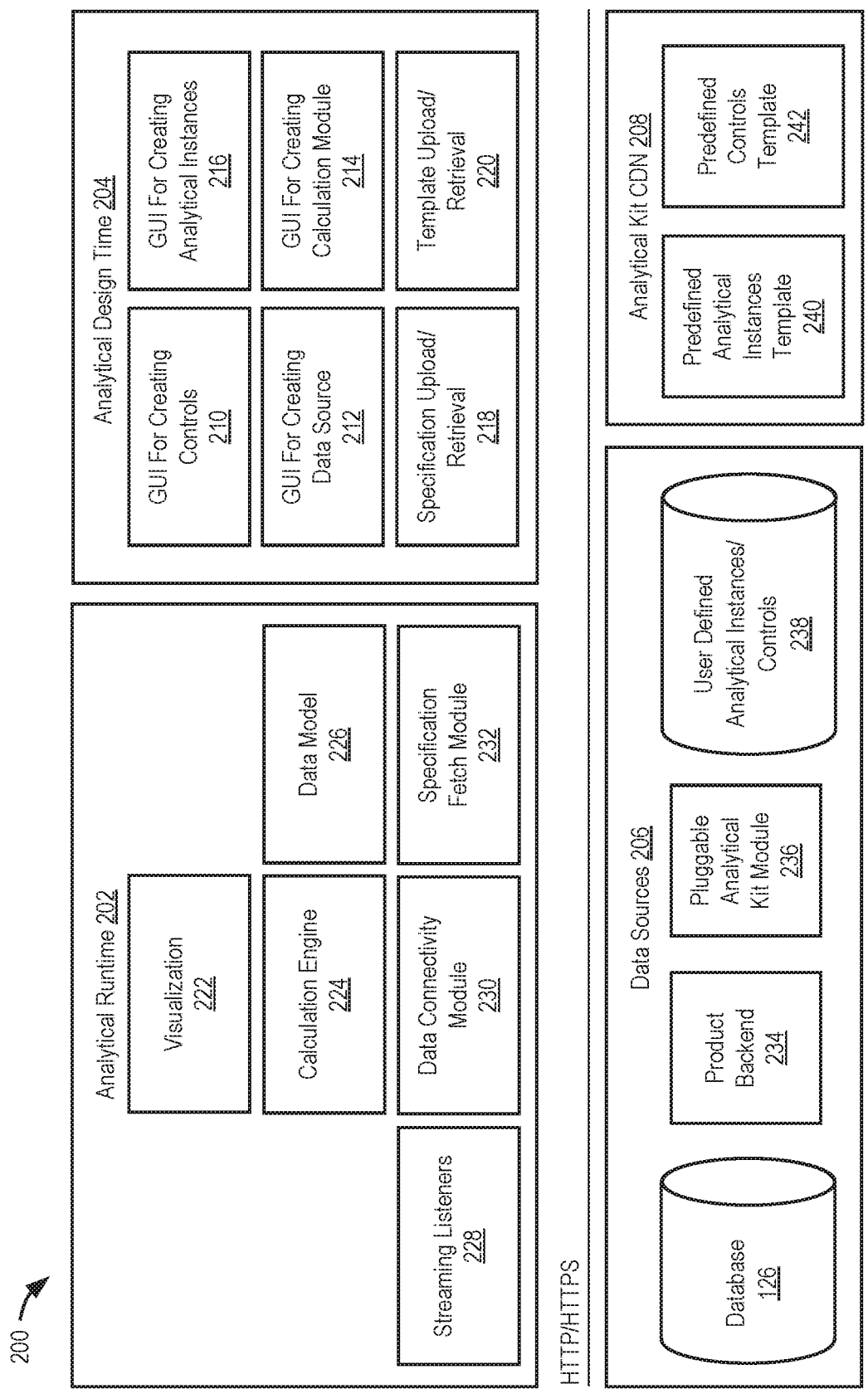
FIG. 2 is a block diagram illustrating aspects of an analytics design system, according to some example embodiments.

FIG. 2 is a block diagram illustrating aspects of an analytics design platform 200, according to some example embodiments. The analytics design platform 200 includes an analytical design time system 204, an analytical runtime system 202, one or more data sources 206, and an analytical kit content delivery network (CDN) 208. In one example, the analytical runtime system 202 and analytical design time system 204 reside on one or more front end systems (e.g., client devices 110 or systems associated with client devices 110) and the data sources 206 and analytical kit CDN 208 reside on one or more backend systems (e.g., third-party server(s) 130, server system 102, etc.).

The analytical design time system 204 is used for extending analytical solutions for visualization and computation without further programming and allows a business user to define workflows with the help of a graphical user interface (GUI). This system eliminates the necessity of a software developer for enhancements of analytical visualization and computations. The analytical design time system 204 further allows users (e.g., more savvy business users or software developers) to generate templates to be used by business users to generate analytical visualization (e.g., advances visualizations)). Accordingly, the analytical design time system 204 may be used to either create an analytical instance from predefined templates (e.g., create/design a visualization from a predefined template) or generate new templates that can be used as future predefined templates.

The GUI for creating controls 210 provides tools for a user to create one or more visualization controls for a visualization. The GUI for creating controls 210 (also "GUI 210") will help a business user create a visualization control without any kind of programming. In one example, the output of the GUI 210 while creating a visualization control is a JSON-based specification that can be uploaded for referencing internally within an organization, or it can be published publicly for global access of a visualization control (e.g., as a template).

The GUI for creating a data source 212 provides tools for a user to link one or more data sources 206 that will provide data for the visualization and/or the calculation module. The GUI for creating a calculation module 214 provides tools for a user to define the calculations for the visualization. For example, a user can define merging two datasets, joining different data, aggregating data, inputting a script (e.g., JavaScript) for more complex calculations, and so forth. In one example, one or more calculation modules or units may be defined. A calculation module can take data from another calculation module or from a data model. A data model can store an output from one or more calculation modules.

The GUI for creating analytical instances 216 generates an executable entity for the visualization. For example, an analytical instance is an executable unit which includes visualization controls, data processing modules, calculation modules and other dependent resources. The analytical instance can be executed in a browser or hybrid mobile application to generate an analytical visualization, animation, or video. This is beneficial since a user can just use a mobile or other device (e.g., client device 110) to design a visualization or run a visualization, without any need for a high-end server. In one example, the definition of the analytical instance is serializable to store as an entity and it will be de-serialized and executed in a web session. The output of an analytical instance execution is a series of HTML content updated based on the configured frequency in the parent container of the analytical instance.

The analytical instance (e.g., one JSON structure) is stored as a specification and can be uploaded or retrieved via the specification upload/retrieval module 218. The template upload/retrieval module 220 allows a user to upload a newly designed template or retrieve a predefined template to and from a server system (e.g., server system 102 or analytics design system 124).

Most of the entities of a visualization are defined by specification, which helps to customize and extend the visualization and the computation according to the business need. The entities that can be defined by specifications include visualization controls (predefined or user defined), data model (e.g., structured, unstructured, derived) and data connectivity, events, interactivity, calculation process, and analytical instance (complete executable entity that contains all of the above entities). A visualization control is a viewable entity. In one example a visualization control is a scalable vector graphics (SVG), a HTML5 visualization, or a hybrid visualization. A hybrid visualization can be defined by HTML5 controls, other HTML5 visualizations, and SVG visualizations.

In one example, a visualization control is composed of multiple granular visual elements. Each element could be a simple shape like a line, a rectangle, or a circle, or each element could be a complex element such as an image, SVG content, or HTML control. Visualization control includes interactive controls such as a button, a slider, or text input fields. Interactivity could be a simple button click, type text input, a moving of a slider, or transformation (rotate, resize, move) of a SVG content/image, and so forth. Attributes of the visualization controls, which define dimension of control and other visual aspects, can be defined as formulas based on the data model. In one example, visualization can be configured and controlled based on CSS styles, which gives more flexibility to customize the visualization.

Figure 3:
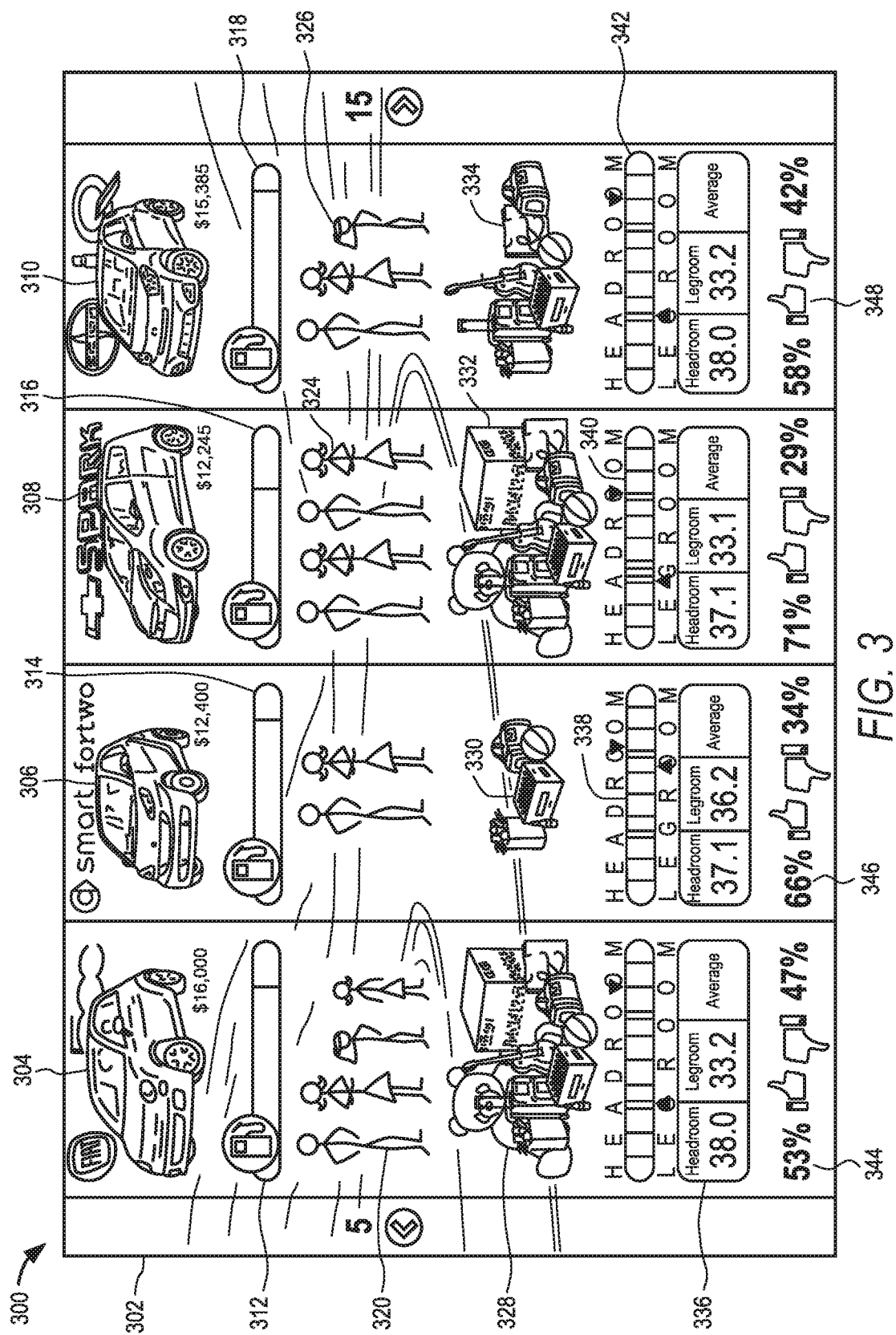
FIGS. 3-7 illustrate example graphical user interfaces, according to some example embodiments.
Figure 4:
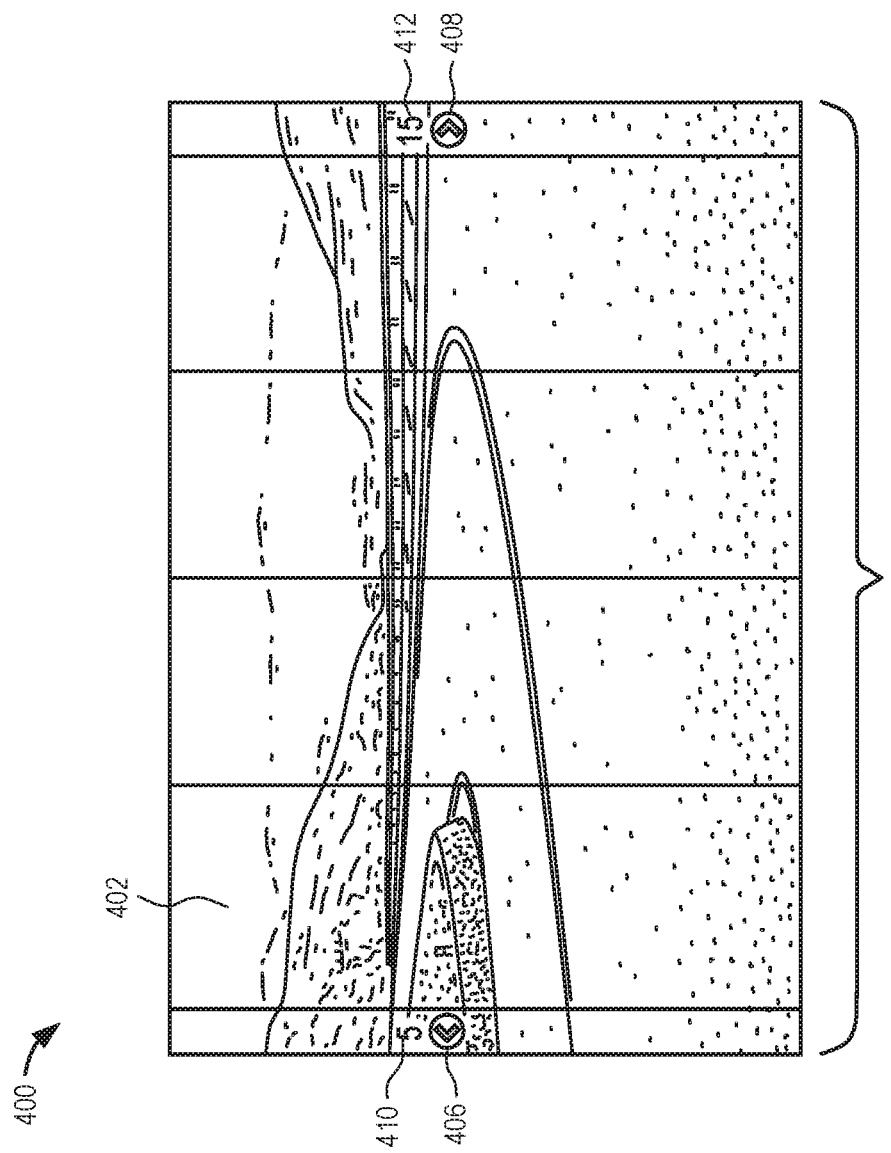

FIG. 3 illustrates a visualization example 300. The visualization example 300 is an example of a hybrid visualization which consists of multiple visualizations 302-348. For example, a first visualization in the visual example 300 is a carousel control 302, as shown alone as the carousel control 400 in FIG. 4. In FIG. 4, the example carousel control 400 comprises a background image 402, a horizontal stack 404, a left arrow 406 and a right arrow 408 for navigation, and number placeholders 410 and 412 for remaining left and right items. The specification for this example carousel control 400 is as follows:

```
{
    Name: "carousel control",
    type: "HTML5",
    content: {
      [
        {
           refid : background
           type : image,
           url : t{{img_path}}
           css : {
              position : absolute,
              top : 0,
              left : 0,
              right : 0,
              bottom : 0
           }
        },
        {
           refid : horz_stack,
           type : horz_array,
           items : [ ],
           size : 0,
           offset : 0,
           visible count : 0,
           css : {
              position : absolute,
              top : 0,
              left : 0,
              right : 0,
              bottom : 0,
              display : flex,
              flex-direction: row
           }
        },
        {
           refid : left_arrow,
           type : image,
           css : {
              position : absolute,
              top : 50%,
              left : 10px,
              width : 20px,
              height : 20px
           }
        },
        {
           refid : right_arrow,
           type : image,
           css : {
              position : absolute,
              top : 50%,
              right : 10px,
              width : 20px,
```

-continued

```
              height : 20px
           }
        },
        {
           refid : left items,
           type : text,
           css : {
              position : absolute,
              top : 10px,
              right : 10px,
              width : 20px,
              height : 20px
           }
        },
        {
           refid : right_items,
           type : text,
           css : {
              position : absolute,
              top : 10px,
              right : 10px,
              width : 20px,
              height : 20px
           }
        }
      ]
    },
    attributes :
    [
      {
         attr_id : size,
         refid : horz_.stack,
         path : /size,
      },
      {
         attr_id : item_pos,
         refid : horz_.stack,
         path : /items/index/left
      },
      {
         attr_id : offset,
         refid : horz_.stack,
         path : /offset,
      },
      {
         attr_id : visible_.coun ,
         refid : horz stack,
         path : /visible_count,
      }
    ]
}
```

Figure 5:
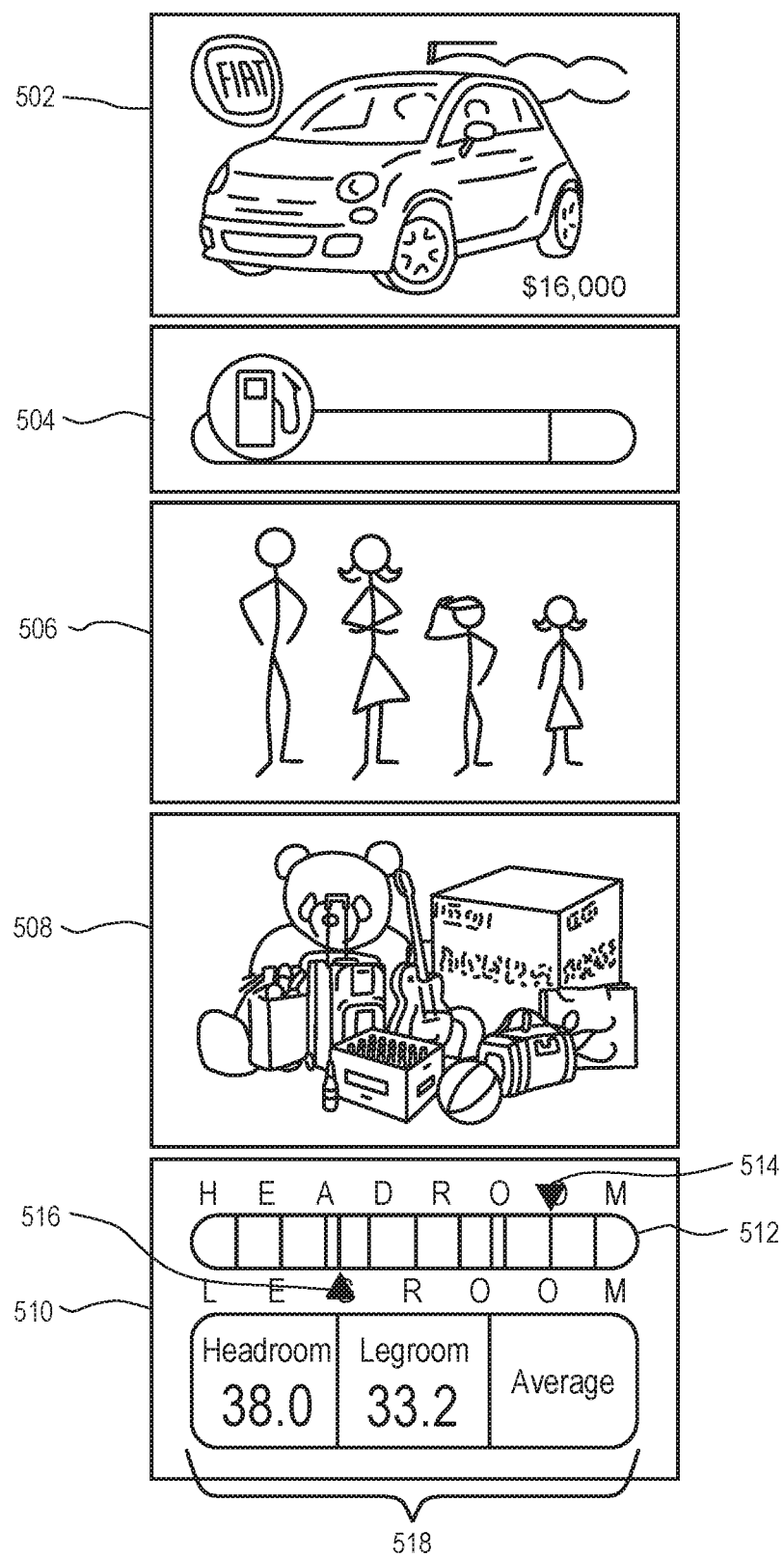

Other example visualizations in visualization example 300 include example visualizations, such as 502-510, shown in FIG. 5. The visualization 502 is an image holder for a product. For example, a user can drag and drop an image to include for the visualization 502, provide a data source for the image, and so forth.

Visualization 504 is a visualization (e.g., SVG visualization) for a gradient fill. A specification for this example gradient fill is as follows:

```
{
  Name: "gradient_fill",
  type: "SVG",
  content: {
    <svg xmlns:dc=\"http://purl.org/dc/elements/1.1/\"
xtmlns:cc=\"http://creativecommons.org/ns#\"
xmlns:rdf=\"http://www.w3.org/1999/02/22-rdf-syntax-ns#\"
xmlns:svg=\"http://www.w3.org/2000/svg\" xmlns=\"http://www.w3.org/2000/svg\"
xmlns:sodipodi=\"http://sodipodi.sourceforge.net/DTD/sodipodi-0.dtd\"
width=\".\"210mm\" height=\"297mm\" viewBox=\"0 0 210 297\" version=\"1.1\"
id=\"svg8\" sodipodi:docname=\"gradientfill.svg\"> <metadata id==\"metadata5\">
</metadata> <g id=\"layer1\"> <rect id=\"rect3680\" width=\"151.94643\"
height=\"36.852676\" x=\"32.505951 \" y=\"111.79166\" style=\"stroke-
width:0.26458332;fill: {{backcolor}}A" ry=\"18.426338\" rx=\"22.300602\" /> <path
style=\"fill.:{{forecolor}}; stroke:#000000;stroke-width:0.26458332px; stroke-
linecap:butt;stroke-linejoin:miter;stroke-opacity: 1\" d=\"m 117.55059,147.88839 c
0.18899,-36.28571 0.18899,-36.28571 0.18899,-36.285711 -65.578866,0.18898 -
6,803572,2,26786 -8,693452,5,10268 -4,157739,8,12649 0,755954,8,31547
6.236605,7.37054 9.827382,4.91369 14.741072,0.37798 34.58482,-0.18899 .z\"
id=\"path3699\" /> </g> </svg>"
  },
  attributes :
  [
    {
      attr_id : fill_percentage,
      path : fill_percentage,
    },
    {
      attr_id : backcolor,
      path : backcolor
    },
    {
      attr_id : forecolor.
      path : forecolor
    }
  ]
}
```

Other visualization controls can be defined with similar specifications, in other example embodiments.

Visualization 506 is a horizontal stack for holding four types of images, and visualization 508 is a collection of multiple images with absolute position. Visualization 510 is a horizontal bar 512 with a top indicator 514 and bottom indicator 516 and a three box container 518 with a label and value.

The overall visualization of FIG. 3 can be defined by referencing all of the sub controls, as shown in the following example:

```
{
    Name: "automobile analysis",
    type: "Hybrid",
    content: {
        [
            {
                refid : am_carousel
                type : control,
                url : /webapp1/controls/carousel_control,
                consumption : render,
                css : {
                    position : absolute,
                    top : 0,
                    left : 0,
                    right : 0,
                    bottom : 0
                },
                inputs : {
                    items : {
                        delegate_ref : @product_list
                    }
                }
            },
            {
                refid : product_list
```

-continued

```
                type : array,
                datatype : @producy_item,
                consumption : dependency,
            },
            {
                refid : product_item,
                type : Hybrid,
                consumption : dependency,
                content : [
                    {
                        refid : thumbnail
                        type : image,
                        url : {{<cur_index>/img_path}},
                        consumption : render,
                        css : {
                            position : absolute,
                            top : 0,
                            left : 0,
                            right : 0,
                            height : 100px
                        }
                    },
                    {
                        refid : gradientfill
                        type : Control,
                        url : /webapp1/controls/gradient_fill,
                        consumption : render,
                        css : {
                            position : absolute,
                            top : 110px,
                            left : 0,
                            right : 0,
                            height : 50px
                        }
                    },
                    {
                        refid : seating_capacity
                        type : Control,
```

```
        url : webapp1/controls/seating_capacity,
        consumption : render,
        css : {
            position : absolute,
            top : 170px,
            left : 0,
            right : 0,
            height : 100px
        }
    },
    {
        refid : luggage_capacity
        type : Control,
        url : /webapp1/controls/luggage_capacity,
        consumption : render,
        css : {
            position : absolute,
            top : 280px,
            left : 0,
            right : 0,
            height : 100px
        }
    },
    {
        refid : space_comfort,
        type : Control,
        url : /webapp1/controls/space_comfort,
        consumption : render,
        css : {
            position : absolute,
            top : 390px,
            left : 0,
            right : 0,
            height : 100px
        }
    },
    {
        refid : social_network_review,
        type : Control,
        url : /webapp1/controls/like_dislike_frame,
        consumption : render,
        css : {
            position : absolute,
            top : 390px,
            left : 0,
            right : 0,
            height : 100px
        }
    }
    ]
    }
    ]
}
```

Returning to FIG. 2, the analytics design platform 200 further includes an analytical runtime system 202. The analytical runtime system 202 allows a user to access and view a visualization (e.g., one or more analytical instances). The visualization component 222 provides for display of one or more visualizations. Multiple visualizations (e.g., visualization controls) may be connected and displayed. The specification fetch module 232 retrieves (e.g., from one or more databases 126 or other data sources 206) one or more specifications to be loaded by the visualization component 222. As explained above, a specification may define several entities, such as visualization controls, data models and data connectivity, events, interactivity, calculation processes (e.g., calculation units), and an analytical instance.

In one embodiment, analytical computation is defined and executed at a web client layer. The data for the visualization may be retrieved (fetched) from the web server layer through various technologies, such as Restful Webservices and Odata Protocol. The web server, as part of the analytical system 200, is a pluggable interface that can be extended in any product's backend layers to get the business data, which can be structured or unstructured data. Set, predefined APIs can help get the real-time data for the client analytical computations.

The calculation engine 224 is responsible for performing calculations for the one or more visualizations (e.g., using one or more calculation modules or units). For example, the calculation engine 224 is responsible for executing analytical operations by applying mathematical calculation, aggregating, filtering, and so forth, on one or more data models to generate or update data models. The calculation engine 224 is responsible for state management of data models and for keeping track of history for the defined scope. The scope of a history of data model change will be either based on a count of data model changes or based on a defined period. The calculation engine 224 is a system which executes calculation units.

In one example, calculation logic can be defined by JavaScript programming. Some core calculation logics may be predefined and shipped with an analytical kit product (e.g., comprising the analytical design time system 204 and the analytical runtime system 202). Any authorized user who has programming knowledge can innovate new calculation logic for a business' needs and use it within their organization, or the logic can be uploaded into an analytical kit cloud (after the security scanning of the logic), and it can be published to make it available for everyone who uses the analytical kit. This enables the public to enhance the analytical operations and share them with other members of the public.

In one example, a newly created calculation logic will be enclosed by an approved template of a JavaScript function, and it will be scanned, serialized, and stored in a backend server system (e.g., server system 102, analytics design system 124) for further consumption of the logic in the analytical instances. When a calculation logic needs to be executed, the function will be fetched from the server system (e.g., from one or more database(s) 126), deserialized as a function object, and then executed.

According to a business user's need, the calculation logic can be executed in the browser engine as a client-side execution, or it can be executed at the web server layer (e.g., introducing node.js as a middleware which can execute the calculation logic JavaScript). For defining a calculation logic, there will be delegate methods for a dataset processing, which could be implemented according to the business' needs. In one example, a delegate includes the following:
  1. Data set level delegate for writing logic at a dataset level
  2. Row level delegate to define logic for a complete row
  3. Cell level delegate to define logic for a specific cell data The following is an example to better illustrate the calculation engine 224. In this example a business' needs include a simulated visualization for monitoring all of a city's traffic signals in real time, in which is needed a simulation to control the traffic with quick predictive analytics. Example requirements include the following:
  All traffic signals of a city need to be monitored
  An application user should be alerted when one or more traffic signal in a specific area is filled with a traffic jam (e.g., those areas or traffic signals may be highlighted to alert the application user)
  Automatic tuning of the traffic green signal timings on the highlighted signals to control the traffic for keeping different timing on each direction. This may include simulating how the situation will be handled better (e.g., with different timing on traffic signals) and identifying a shortest time to bring the traffic to a normal state (e.g., without traffic jams).

For this example, more complex calculations are needed and real-time data needs preprocessing before inputting into the analytical calculation.

Figure 6:
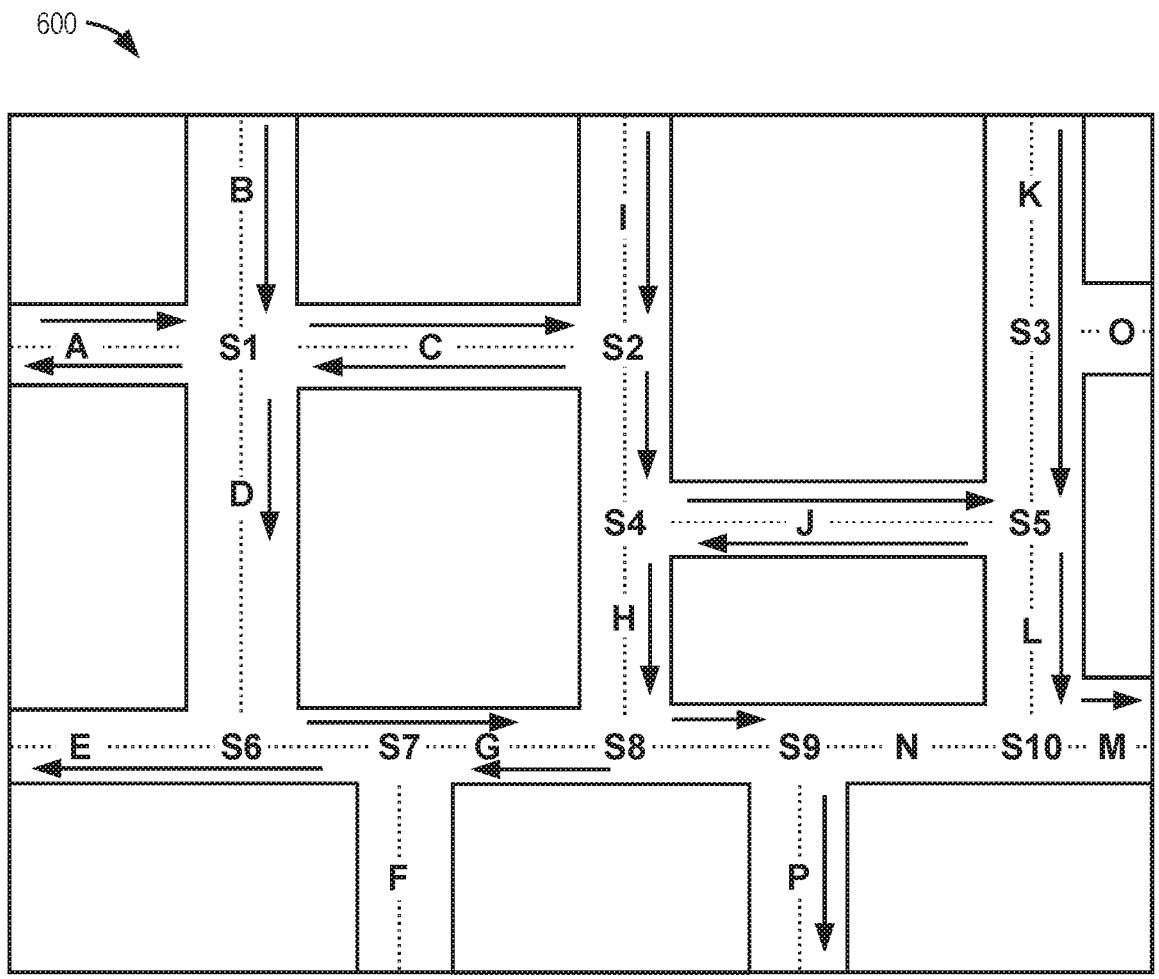

FIG. 6 is an example map 600 showing ten traffic signals (S1, S2 . . . , S10) and multiple routes, such as A-S1-D-S6-G-S8-G-S9-P and B-S1-C-S2-I-S4-J-S5-L-S10-M. Traffic movement on each route will vary. For example, some routes may be heavy, some may be medium, and some may be light. For a single route there are multiple signals, different lengths and widths of the road, and a different frequency of vehicle movement.

The traffic, however, can be balanced if the green signal timing on each direction of a signal is defined based on the traffic load on a single direction. As there are multiple factors to decide the timing of each green signal (e.g., in this simple example there are around 32 green signals), manual calculation will be complex, and cannot be done in real time. Thus, in one example embodiment a visualization control with a geo map can be defined for monitoring all traffic signals of a given region or city. The application user receives an alert about a heavy traffic, for example, the heavy traffic jam at the signals S1, S2, S4, and S5. The user may select the four signals and select an action "Auto-tuning of green signals." The calculation module, which in this example is called "auto-tuning of green signals," can be defined with the following steps:

1. Identify heavy traffic routes
2. Assign an increased time for the green signals of the routes
3. Simulate how the traffic will be improved and record the output
4. Iterate steps 1-3 with different time tunings of signals combination
5. Pick the best output from the iterations.
6. Apply timing of the best output to those green signals
7. Once the traffic reaches to normal state, remove auto-tuning, switch to the default time of green signal (e.g., which may be an equal time in all directions).

This auto-tuning process starts with collecting data from a real-time external application which provides each route's heaviness of traffic, involved roads and signals, and the sequence of road and signals of a route. The data fetch is done by calling a Data Processing API. The Data Processing API takes a list of signals as input and provides routes involved, with heaviness, as output. In this calculation process, there are multiple calculation units that are working together to get the desired output. Some example calculations units include:

1. A calculation unit for getting a traffic load for each of the green signals and the timings for each signal, and calculating the traffic flow on each route.
2. A calculation unit for initiating multiple first units (above mentioned) in an asynchronous manner and choosing a best one among the traffic flow results.
3. A calculation unit for providing a suggestion of time tunings for each green signal, based on the best one chosen among the traffic flow results, which will be passed to the second unit.

These calculation units seem specific to this specific use case, but, in general, these calculation units can be a generic utility to be reused for various business use cases. In one example, a calculation unit will be a user defined (or predefined) JavaScript function and multiple such calculation units can be combined to define a calculation process. The calculation process will be represented as a specification and it will be used by various visualizations.

Figure 7:
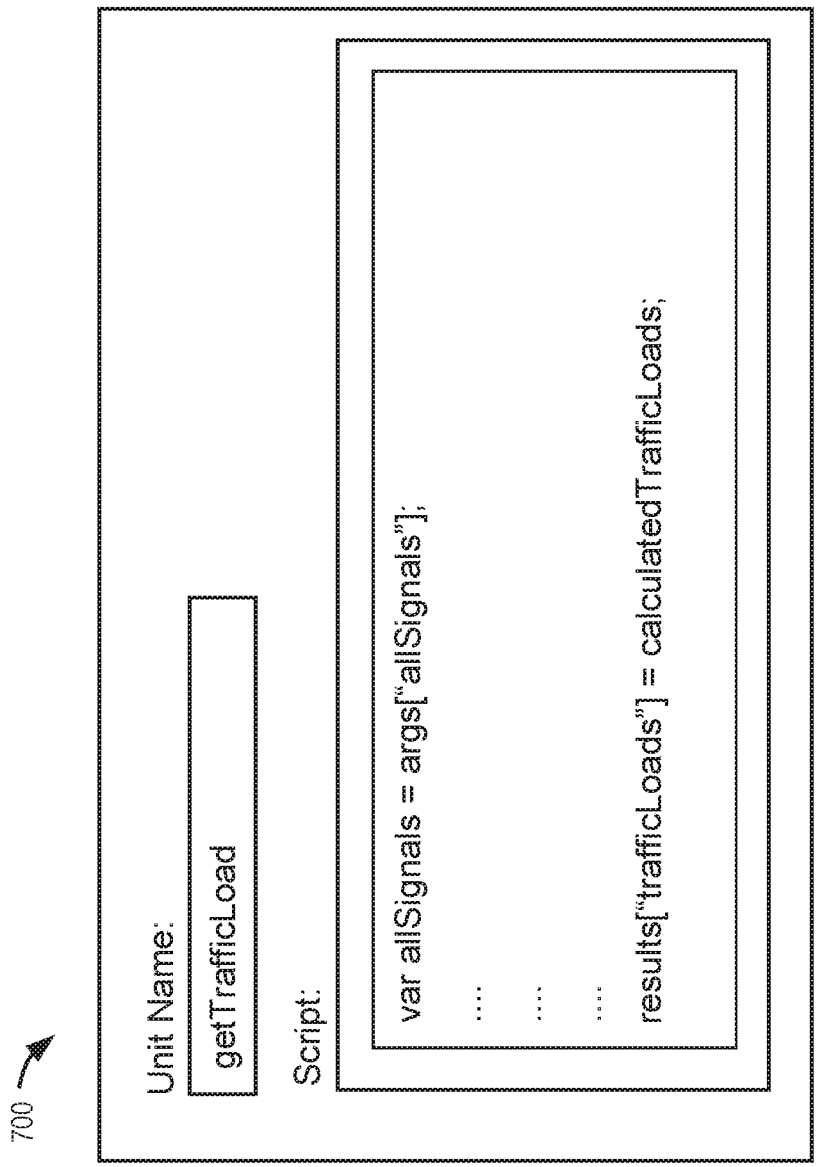

According to the business need, the calculation process can be executed in client side (e.g., browser, hybrid app) or it can be executed on the server layer (e.g., node.js). The GUI for creating a calculation module 214 (also referred to as "GUI 214") is used to define a calculation unit (e.g., by entering JavaScript code). In one example, the GUI 214 will provide an option to connect multiple calculation units to define a calculation module. FIG. 7 shows an example GUI 700 for a user to enter a script (e.g., JavaScript code).

Once the user enters the script, the script will be scanned for security aspects while saving the calculation unit. In one example, the script is stored as string content in the server system. The script content will be sent to the client for execution. At the client side, this string content will be converted to a function and executed according to the workflow defined in the calculation module (e.g., via calculation engine 224). For example:

var fnScript=new Function('args', '<script content>'); // converted to function
var result=fnScript(args); //execution of the script, whenever it is required.

Figure 8:
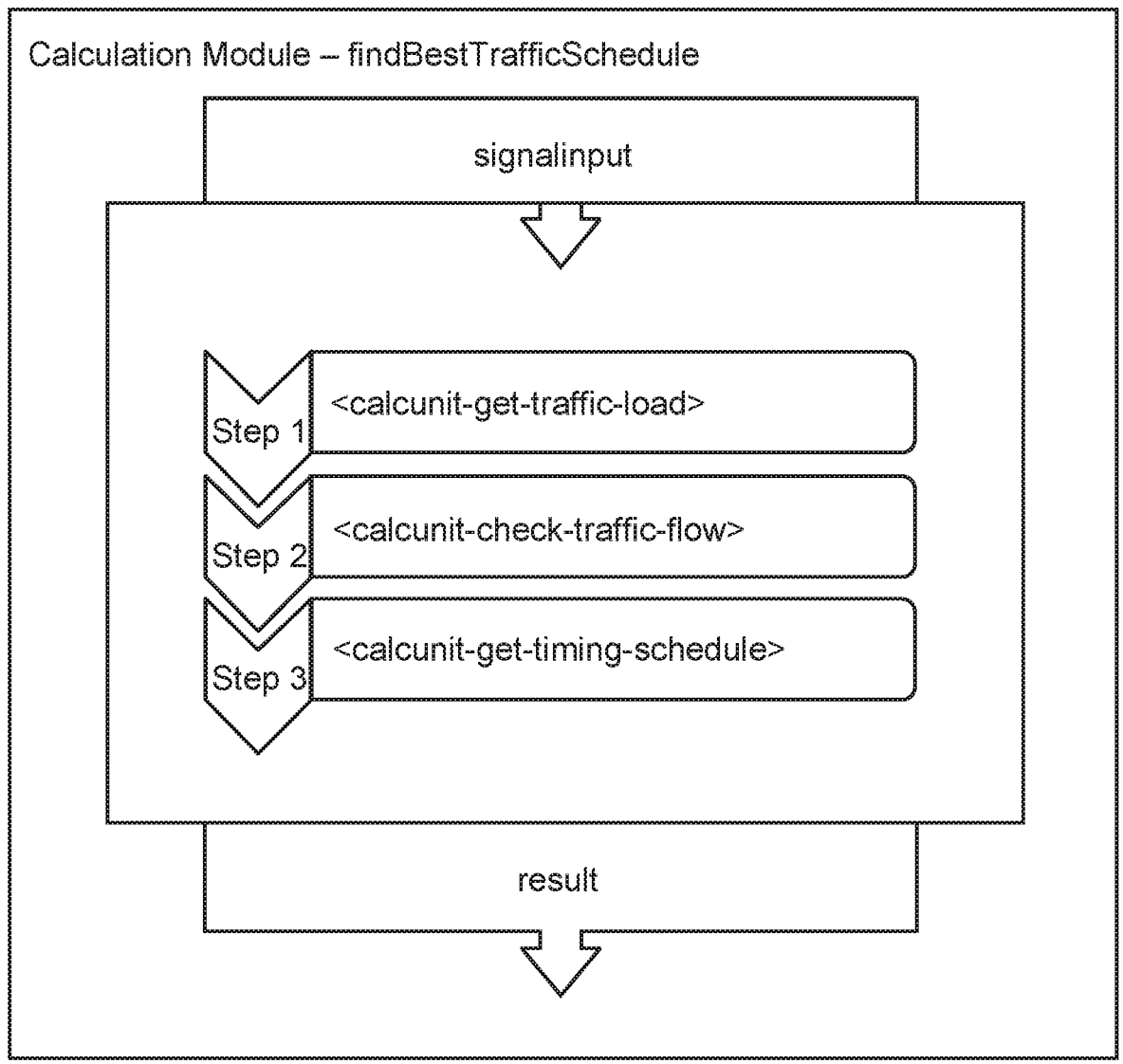
FIG. 8 is a diagram illustrating an example calculation module, according to some example embodiments.

For this example, the following is assumed:
calculation unit 1 is <calcunit-get-traffic-load>
calculation unit 2 is <calcunit-check-traffic-flow>
calculation unit 3 is <calcunit-get-timing-schedule>
Script content for <calcunit-get-traffic-load> is <script-get-traffic-load>
Script content for <calcunit-check-traffic-flow> is <script-check-traffic-flow>
Script content for <calcunit-get-timing-schedule> is <script-get-timing-schedule>
This example calculation module is defined as shown in FIG. 8.

Then this calculation module can be invoked from a visualization control event, from another calculation module, or from a data processing module as a callback function once the latest dataset is received or processed.

Returning to FIG. 2, the data model 226 stores data output by the calculation engine 224 and other data needed for the one or more visualizations that can be retrieved via the data connectivity module 230. For example, the data connectivity module 230 is responsible for fetching data from a backend system and feeding the data to a visualization control (e.g., via visualization component 222). The data model 226 represents the structure of a particular business data. A data model 226 is formed by fetching the data from the server and it will be modified by the calculation engine 224 according to an analytical definition.

Figure 9:
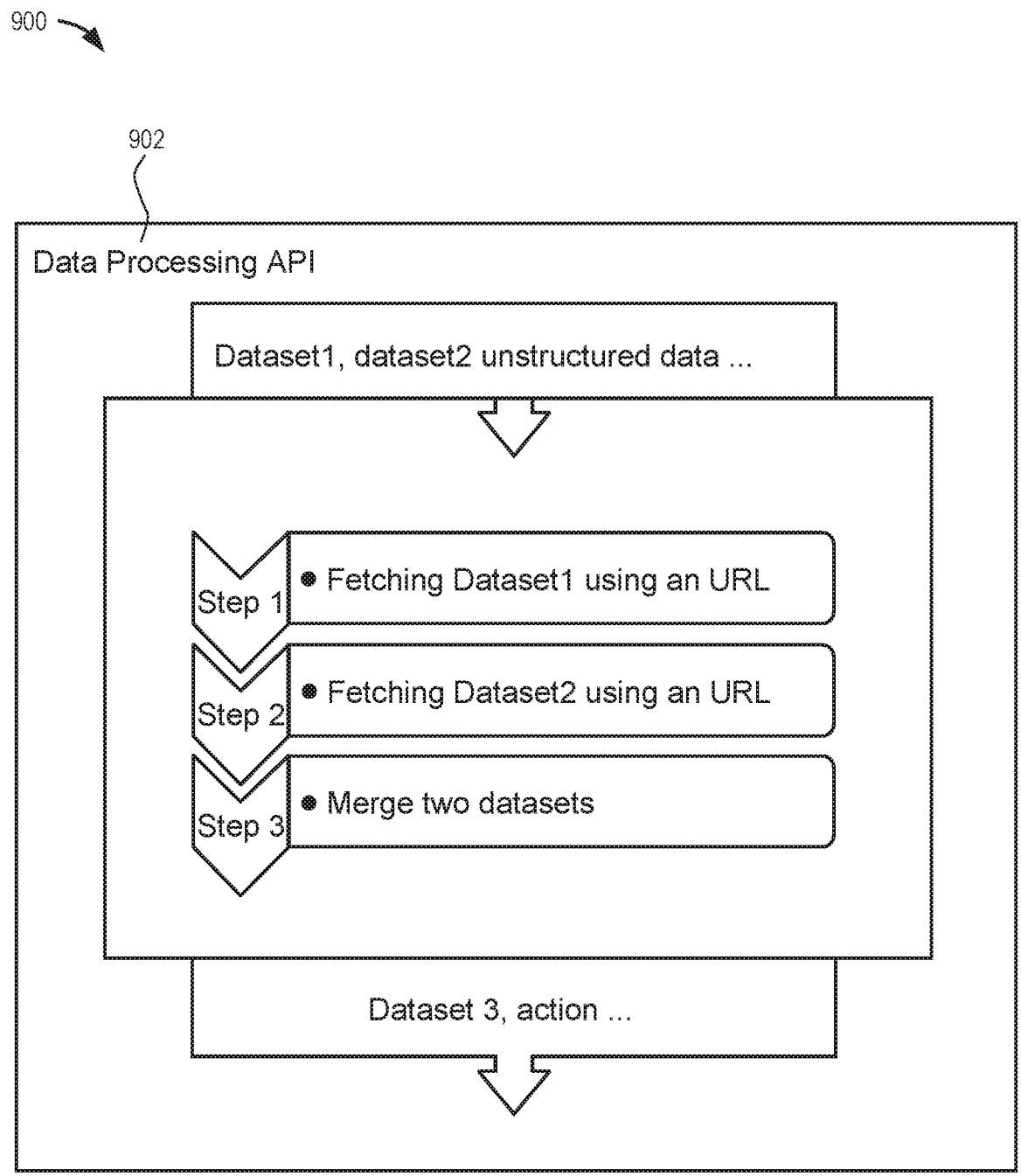
FIG. 9 is a diagram illustrating an example data process application programming interface (API), according to some example embodiments.

In one example, a data processing module (not shown) is a sub-module of the data connectivity module 230 and is responsible for processing data according to a data processing API definition. The data processing API is defined by one or more data processing units, which will be executed by taking one or more datasets as input and will generate an output dataset after processing the one or more datasets. A data processing unit is a simple processing of one or more datasets. The following are some examples of a data processing unit:

Fetching data from a data source, which could be a web response, file set, dataset from another processing unit, and the like
Merging two or more datasets
Filtering datasets
Customizing datasets with specific fields Generating a new data field using a formula based on existing data fields Cross table to flat table conversion and vice versa The data processing API will be represented with a specification, which includes a data input specification, processing units with sequence, and a data output specification. FIG. 9 is a diagram 900 illustrating the process of a data processing API 902 when merging two datasets, as one example (e.g., any kind of operation on data can be performed by a data processing API). The data processing API 902 can be invoked from a visualization control's life cycle and user interactivity on the visualization control. The invocation of the API from visualization control is defined in the GUI for creating (visualization) controls 210.

For example, to define a data processing API (e.g., API 902) using a predefined data processing unit, a user can use a GUI in which an API can be defined by simply dragging and dropping actions and configuration. Some actions may comprise events and interactivity. In one example, an event can be one of the following actions:

A state change in a visualization control lifecycle such as initialization of visualization control, loading/unloading event of UI elements, and an update in UI elements after the completion of a data processing API execution An interval-based update on a visual element that can automate the visualization for a video or animation that can show real-time analytical insights An action or navigation triggered based on the user interactivity on the visualization control A change in a data model based on the streaming data defined in the data connectivity Web UI to control specific events such as text changes, button click, selecting a check box, URL navigation, drag and drop, resize, and so forth.

User interactivity, such as mouse clicks and touch gestures, on the visualization control will be associated to an event according to the business' need, which can be customized for each control in a different way to support analytical use cases. User interactivity examples include mouse clicks (single or double), mouse drag and drop, tap (single, double, multiple), swipe (up, left, right, down), long press, and the like.

Streaming listeners 228 may be utilized to regularly update specific data in one or more visualizations. In example embodiments, achieving streaming analytics visualization is much easier. For example, a visualization can be updated with a series of HTML or periodic updates of existing HTML through JavaScript. The update can be applied in the complete visualization control or sub-components of a visualization control. Some examples of the updates are periodic resize of visual components, periodic sorting/ordering of elements, periodic update of position of elements, and so forth.

The analytics design platform 200 may further comprise access to one or more data sources 206, for example on one or more backend server or other computing systems. Example data sources 206 include one or more databases (e.g., database 126 associated with server system 102), product backend data, data comprising one or pluggable analytical kit modules 236, user defined analytical instances/controls 238, and so forth. The data sources 206 may be internal to a particular organization, external data sources, or a combination of internal and external data sources. The analytics design platform 200 may further comprise an analytical kit content delivery network (CDN) 208 that comprises predefined analytical instances templates 240 and predefined controls templates 242.

Figure 10:
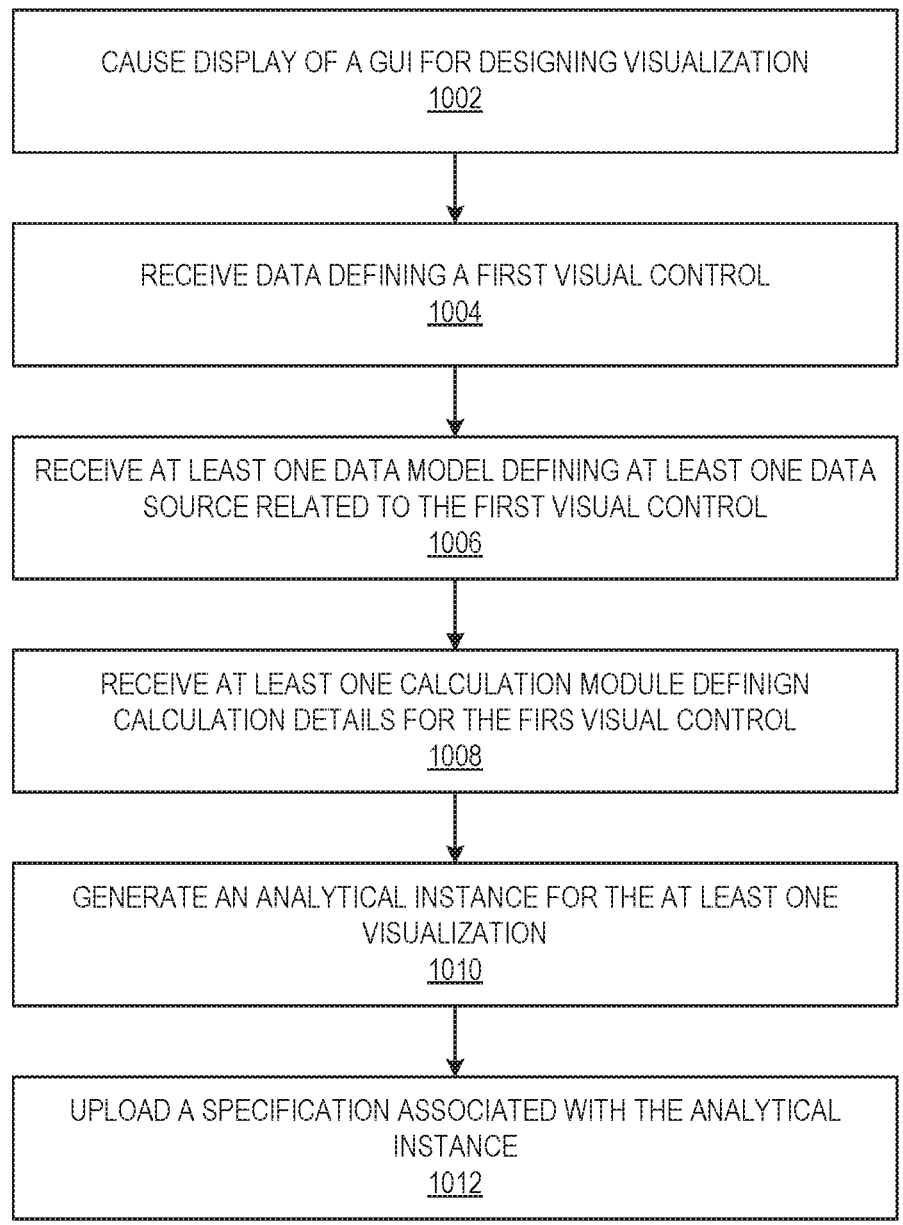
FIGS. 10-11 are flowcharts each illustrating aspects of a method, according to some example embodiments.

FIG. 10 is a flow chart illustrating aspects of a method 1000 for designing a visualization, according to some example embodiments. For illustrative purposes, method 1000 is described with respect to the networked system 100 of FIG. 1 and the example block diagram in FIG. 2. It is to be understood that method 1000 may be practiced with other system configurations in other embodiments.

As described above, a user may use a GUI for designing a visualization to either design a visualization from a predefined template of a plurality of predefined templates or a user may design a visualization without a predefined template that may then be stored and used by other users as a predefined template. In the first case, a computing system or device (e.g., client device 110) displays a GUI with options for available predefined templates from which the user may choose one or more predefined templates to use to design a visualization, in one example. In another example, the user may already know a location or name of a predefined template and input the location (e.g., URL or other means), or name (e.g., unique name or identifier) to request the predefined templated. The computing device then retrieves the requested predefined templates and displays a GUI for designing a visualization using the template. The predefined template may comprise at least one visualization control, data model, and calculation module.

In the second case, a user may want to design a visualization without a predefined template. In this case the computing device does not need to retrieve any predefined template and can display the GUI for designing the visualization.

Accordingly, in operation 1002, a computing device causes display of a GUI for designing a visualization. Using the GUI, the user is able to define one or more visualization controls, data models, and calculations modules.

In operation 1004, the computing device receives data defining a first visualization control. As explained above, a visualization control is a viewable entity. In one example, a visualization control is comprised of multiple granular visual elements, such as a line, a rectangle, a circle, an image, SVG content, HTML control, and so forth. Visualization control can also comprise interactive controls, as explained above. Some example visualization controls are shown in FIG. 5, as explained above. A user may select a predefined visual control of a plurality of predefined visual controls as part of a predetermined template, or a user may create his or her own visual control. Examples of a predefined visual control include image(s), button(s), input field(s), shape(s), container(s), and so forth. A user may create more than one visual control for the visualization.

The data may be received from the user via the GUI by entering text information (e.g., defining position, size, any dynamic properties, and so forth), selecting one or more data from the GUI (e.g., dragging and dropping a predefined visual element or control into the GUI for the visualization), and so forth. The data defining the first visualization control may include one or more visual elements. The user may define one or more visualization controls (e.g., comprising one or more visual elements) for the visualization. In one example, when a predefined visual control is selected (e.g., dragged and dropped into the visualization design or selected to appear in the visualization design), a (predefined) specification of the predefined visual control is embedded into the visual control along with any user inputs for position, size, any dynamic properties, and so forth.

In operation 1006, the computing device receives a data model defining at least one data source related to the visualization control. For example, using the GUI, the user can define one or more data models.

In one example, a visual control can have zero, one, or more data models. For example, a visual control can be a simple entity, without any data model, such as a visual control for displaying a current time as a clock, which does not need any data for a data source but can be defined by a predefined formula/API. The predefined formula/API can be processed and generated by the system 204 directly or the data can be retrieved from a calculation module, which may originate the data using some programming, script, external URL, devices such as a camera or mic, and so forth.

As described above, a data model defines the data and data sources for the visual control and visualization. The GUI will allow the user to link one or more data sources that will provide data for the visualization. For example, the user may specify what data is necessary for each element of the visualization and what data sources should be used to obtain the data (e.g., a URL or other location information of the data and data source).

In one example, if a user has created a template, the user can specify a data source endpoint. The template will be used by other users to create a data processing API. Or, if a user is directly creating a data processing API, he or she can provide the data source information directly. A visual control or calculation unit can use the data source API for accessing the data.

The computing device then generates the data model using the information from the user comprising the data and the data sources. In one example, the data model is data with specific structure stored in memory, which will be used by a visual control or calculation unit. In one example, a data model consists of metadata (e.g., the structure of the data and the actual data).

In operation 1008, the computing device receives at least one calculation module defining calculation details for the visualization control. For example, a user may use tools provided in the GUI for defining calculations for the visualization. As explained above, example calculations include merging two datasets, joining different data, aggregating data, and so forth, or the tools may allow the user to input a script for more complex calculations (or import a script or otherwise define more complex calculations). If a user is using a predefined template, these calculations may be predefined; the user just needs to select which calculation(s) he desires to use in the visualization. A user may also define new calculations that are not part of the predefined template. A user not using a predefined template may still access predefined calculations and also (or only) define new calculations. Calculations details may be provided by the user by selecting predefined calculations, inputting new calculations, and the like. The calculations can use data from other calculations modules or provide output to be used in other calculation modules.

In operation 1010, the computing device generates an analytical instance for the visualization. The analytical instance comprises at least one visualization control, at least one data model, and at least one calculation module. For example, from the visualization control(s), data model(s), and calculation module(s) defined by the user, the computing device generates an executable object or unit that comprises the visualization control(s), data model(s), and calculation module(s) defined by the user. This analytical instance can be executed in a browser or application (e.g., hybrid mobile application) to view and interact with the visualization.

In operation 1012, the computing device uploads a specification associated with the analytical instance to a server system. In one example, the analytical instance is stored as a specification defining the details of the visualization (e.g., comprising the analytical instance, data model(s), calculation unit(s), and so forth). The analytical instance can be a visualization to be executed on a client device 110 or can be stored as a predefined template to be used by other computing devices to design the visualization. The predefined template is just like an analytical instance in format, but has placeholders for some values which will be defined while using the template for analytical instance creation (e.g., using the analytical design time system 204).

Figure 11:
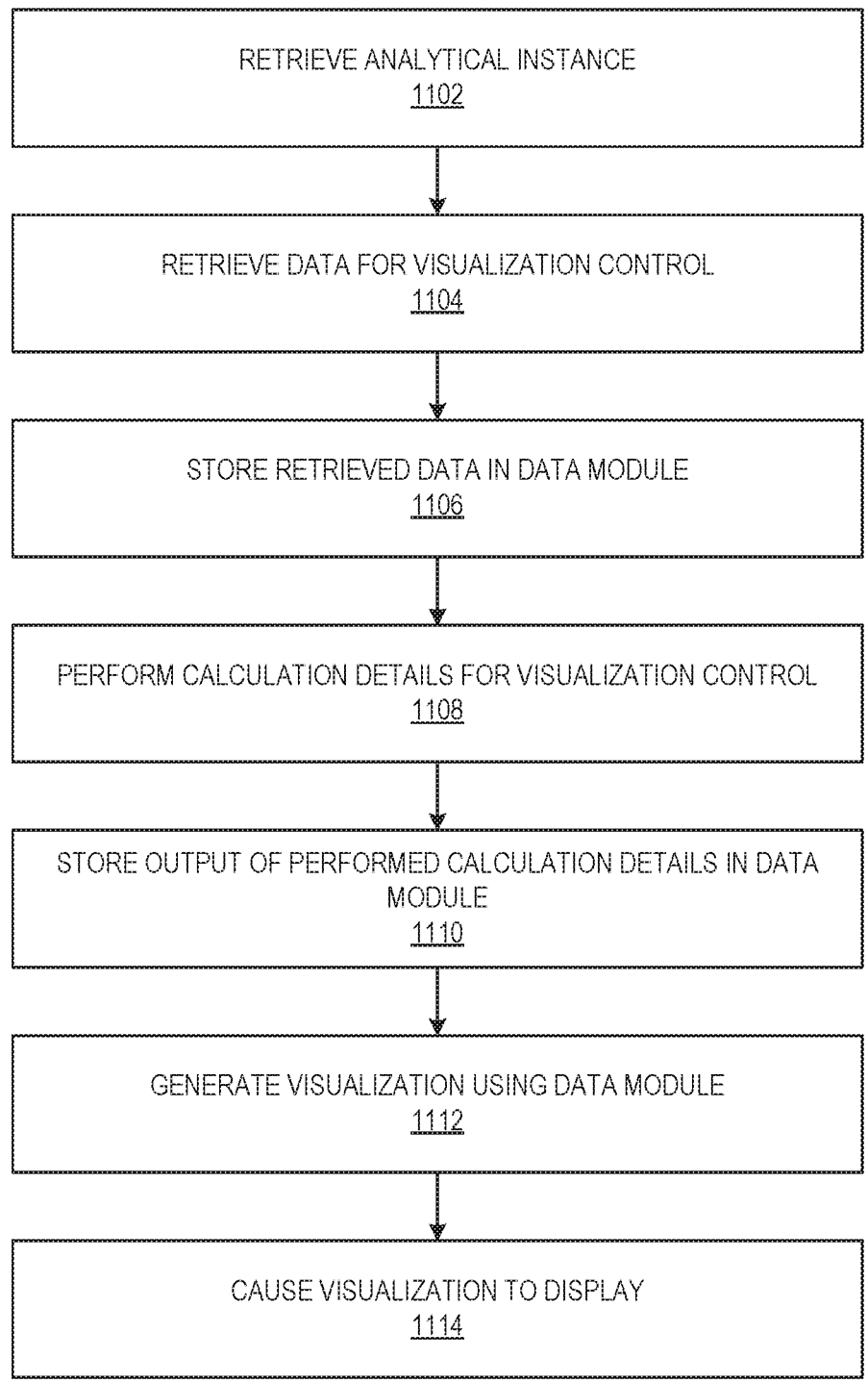

FIG. 11 is a flow chart illustrating aspects of a method 1100 for executing an analytical instance to display a visualization, according to some example embodiments. For illustrative purposes, method 1100 is described with respect to the networked system 100 of FIG. 1 and the example block diagram in FIG. 2. It is to be understood that method 1100 may be practiced with other system configurations in other embodiments.

In operation 1102, a computing device (e.g., client device 110) retrieves an analytical instance to be executed on the computing system. For example, a user may request to view a particular visualization (e.g., via a GUI) and the computing system retrieves the analytical instance associated with the particular visualization.

The computing device then executes the analytical instance to cause the visualization to display. In one example, executing the analytical instance comprises operations 1104-1112. In operation 1104, the computing device retrieves data for each visualization control in the visualization. For example, the computing device analyzes the data model for the analytical instance to determine what data from which data sources are needed for the visualization. The computing device uses the information from the data model to fetch all of the data and store it in the data model, as shown in operation 1106.

In operation 1108, the computing device performs the calculation details for each visualization control of the visualization. For example, the computing device analyzes the calculation module to determine the calculation details (e.g., what calculations to perform) and performs the calculation details (e.g., performs the calculations). In one example, the computing system uses the data in the data model to perform the calculation details. The computing device stores an output for the performed calculation details as additional data in the data model, as shown in operation 1110.

In operation 1112, the computing device generates the visualization using data specified in each visualization control of the visualization, and data stored in the data model. For example, the computing device generates the visualization using data from the data model(s), which will be referred as a formula or metadata reference in one or more visual controls, that will be derived to get the needed data for the visualization.

In operation 1114, the computing device causes the visualization to display to the user. The user may interact with the visualization, which will cause the visualization to change or update, according to the defined visualization control(s).

Example embodiments provide for a number of benefits. For instance, example embodiments simplify the process of defining and customizing analytical solutions for business needs. Also, example embodiments provide the flexibility of running end-to-end workflows within a client layer, by taking only the data set (which can be a structured or unstructured data, processed or unprocessed data, etc.). Since end-to-end workflow runs on a web client layer, in one example embodiment, it will work on all desktop and mobile operating system (e.g., Windows, Mac, Android, iOS). Moreover, a business user can define any complex visualizations without any programming knowledge. Furthermore, the entities, such as visualization control, data processing units/modules, and calculation units/modules, can be shared as a public resource for the benefit of others. This enables more people to contribute and use solutions.

Other benefits include that client-side execution of analytics calculations makes it easier to include external data and input from external devices such as a camera, sensors, electronics devices, and the like. Example embodiments create a simplified and highly customizable approach since all the entities are represented as a specification, and the specification will be parsed and executed by a corresponding module engine to achieve variants of a functionality. This approach enables the analytics mingled with business processing by incorporating machine learning techniques and for executing automated best course of action.

Figure 12:
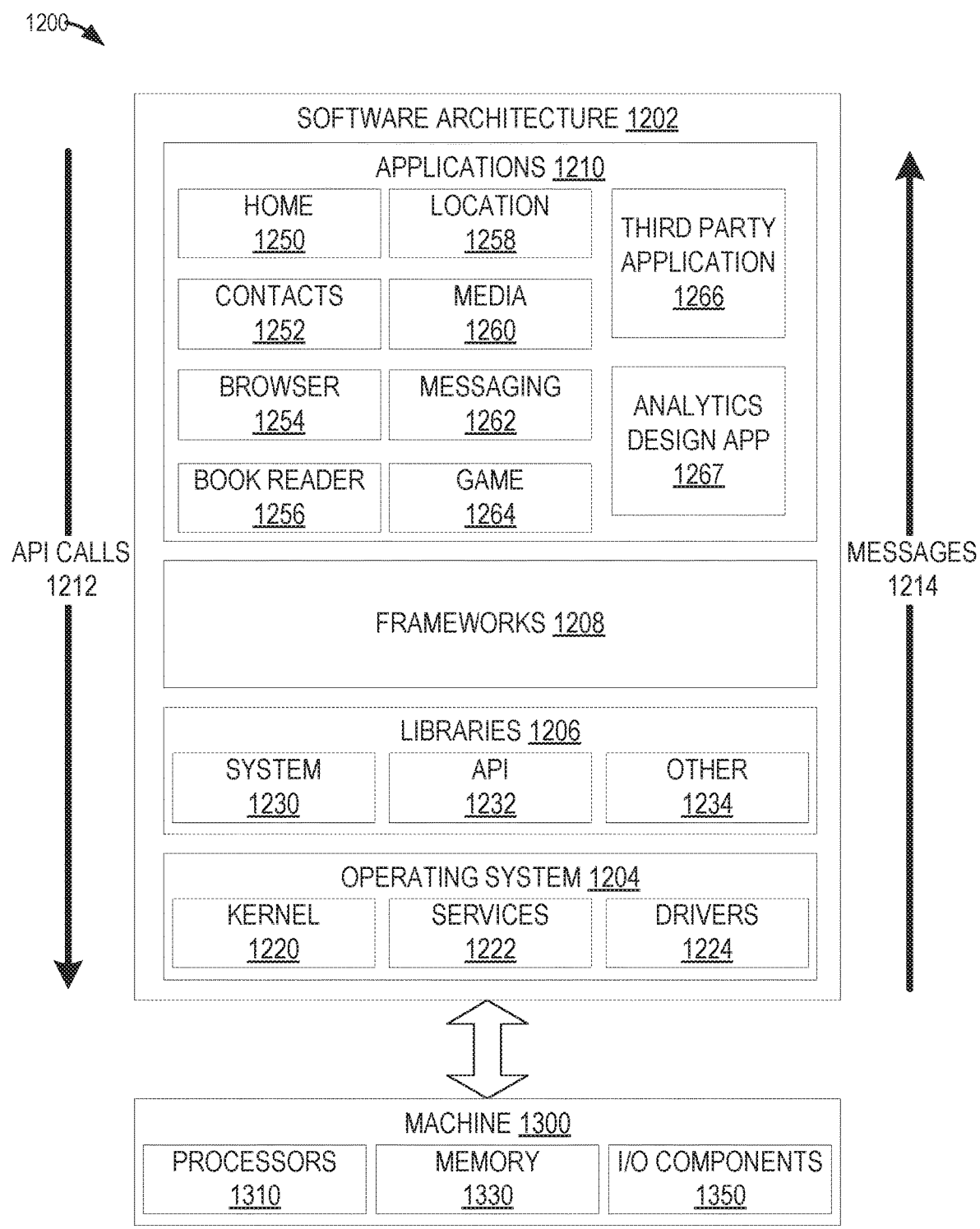
FIG. 12 is a block diagram illustrating an example of a software architecture that may be installed on a machine, according to some example embodiments.

FIG. 12 is a block diagram 1200 illustrating software architecture 1202, which can be installed on any one or more of the devices described above. For example, in various embodiments, client devices 110 and servers and systems 130, 102, 120, 122, and 124 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1266 can invoke the API calls 1212 provided by the operating system 1204 to facilitate functionality described herein.

Some embodiments may particularly include analytics design application 1267. In certain embodiments, this may be a stand-alone application that operates to manage communications with a server system such as third-party servers 130 or server system 102. In other embodiments, this functionality may be integrated with another application. The analytics design application 1267 may request and display various data related to designing and viewing analytics and may provide the capability for a user 106 to input data related to the objects via a touch interface, keyboard, or using a camera device of machine 1300, communication with a server system via I/O components 1350, and receipt and storage of object data in memory 1330. Presentation of information and user inputs associated with the information may be managed by analytics design application 1267 using different frameworks 1208, library 1206 elements, or operating system 1204 elements operating on a machine 1300.

Figure 13:
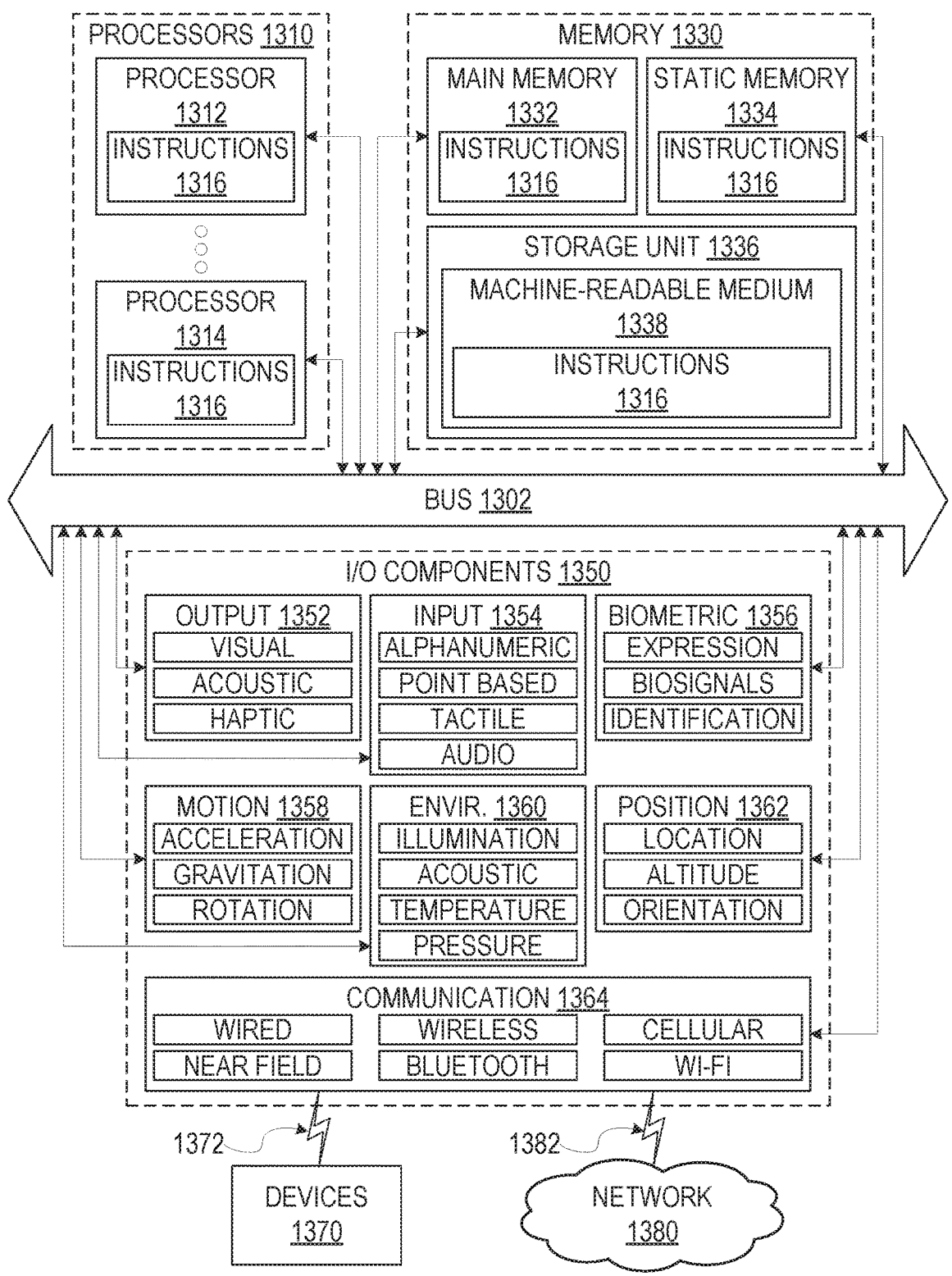
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 1210, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine 130, 102, 120, 122, 124, etc., or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1312, 1314 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    causing display, by a computing system, of a graphical user interface for designing at least one visualization;
    receiving, by the computing system, data defining a first visualization control;
    receiving, by the computing system, a least one data model defining at least one data source related to the first visualization control;
    receiving, by the computing system, at least one calculation module defining calculation details for the first visualization control;
    generating, by the computing system, an analytical instance for the at least one visualization comprising the first visualization control, the at least one data model, and the at least one calculation module;
    uploading to a server system, by the computing system, a specification associated with the analytical instance;
    retrieving, from the server system, the specification and analytical instance; and
    executing the analytical instance, wherein executing the analytical instance comprises:
        retrieving data from the at least one data source related to the visualization control;
        storing the retrieved data in the at least one data model;
        performing the calculation details for the first visualization control;
        storing an output of the performed calculation details in the at least one data model; and
        generating the at least one visualization using the data model.

2. The method of claim 1, further comprising:
    causing the at least one visualization to display.

3. The method of claim 1, wherein before causing the display of the graphical user interface for designing the at least one visualization, the method comprises:
    retrieving a predefined template for the at least one visualization; and
    wherein the graphical user interface displays the predefined template, and the first visualization control, the at least one data model, and the at least one calculation module are part of the predefined template.

4. The method of claim 1, further comprising:
    storing the at least one visualization comprising the defined first visualization control, the data model, and the calculation module, as a template to be accessed by other computing devices.

5. The method of claim 1, further comprising:
    receiving data defining a data processing application programming interface (API); and
    wherein the at least one visualization comprises the first visualization control, the at least one data model, the at least one calculation module, and the data processing API.

6. The method of claim 1, wherein the first visualization control comprises a scalable vector graphics (SVG), a HTML5 visualization, or a hybrid visualization.

7. The method of claim 1, wherein the first visualization control is composed of multiple visual elements comprising at least two of a group comprising: a line, a rectangle, a circle, an image, SVG content, HTML control, a button, a slider, and a text input field.

8. A system comprising:
    a memory that stores instructions; and
    one or more processors configured by the instructions to perform operations comprising:
        causing display of a graphical user interface for designing at least one visualization;
        receiving data defining a first visualization control;
        receiving a least one data model defining at least one data source related to the first visualization control;
        receiving at least one calculation module defining calculation details for the first visualization control;
        generating an analytical instance for the at least one visualization comprising the first visualization control, the at least one data model, and the at least one calculation module;
        uploading to a server system a specification associated with the analytical instance; retrieving, from the server system, the specification and analytical instance; and
        executing the analytical instance, wherein executing the analytical instance comprises:
            retrieving data from the at least one data source related to the visualization control;
            storing the retrieved data in the at least one data model;
            performing the calculation details for the first visualization control;
            storing an output of the performed calculation details in the at least one data model; and
            generating the at least one visualization using the data model.

9. The system of claim 8, the operations further comprising:
    causing the at least one visualization to display.

10. The system of claim 8, wherein before causing the display of the graphical user interface for designing the at least one visualization, the operations comprise:
retrieving a predefined template for the at least one visualization; and
wherein the graphical user interface displays the predefined template, and the first visualization control, the at least one data model, and the at least one calculation module are part of the predefined template.

11. The system of claim 8, the operations further comprising:
storing the at least one visualization comprising the defined first visualization control, the data model, and the calculation module, as a template to be accessed by other computing devices.

12. The system of claim 8, the operations further comprising:
receiving data defining a data processing application programming interface (API); and
wherein the at least one visualization comprises the first visualization control, the at least one data model, the at least one calculation module, and the data processing API.

13. The system of claim 8, wherein the first visualization control comprises a scalable vector graphics (SVG), a HTML5 visualization, or a hybrid visualization.

14. The system of claim 8, wherein the first visualization control is composed of multiple visual elements comprising at least two of a group comprising: a line, a rectangle, a circle, an image, SVG content, HTML control, a button, a slider, and a text input field.

15. A non-transitory computer-readable medium comprising instructions stored thereon that are executable by at least one processor to cause a computing device to perform operations comprising:
causing display of a graphical user interface for designing at least one visualization;
receiving data defining a first visualization control;
receiving a least one data model defining at least one data source related to the first visualization control;
receiving at least one calculation module defining calculation details for the first visualization control;
generating an analytical instance for the at least one visualization comprising the first visualization control, the at least one data model, and the at least one calculation module;
uploading to a server system a specification associated with the analytical instance;
retrieving, from the server system, the specification and analytical instance; and
executing the analytical instance, wherein executing the analytical instance comprises:
retrieving data from the at least one data source related to the visualization control;
storing the retrieved data in the at least one data model;
performing the calculation details for the first visualization control;
storing an output of the performed calculation details in the at least one data model; and
generating the at least one visualization using the data model.

16. The non-transitory computer-readable medium of claim 15, the operations further comprising:
causing the at least one visualization to display.

17. The non-transitory computer-readable medium of claim 15, wherein before causing the display of the graphical user interface for designing the at least one visualization, the operations comprise:
retrieving a predefined template for the at least one visualization; and
wherein the graphical user interface displays the predefined template and the first visualization control, the at least one data model, and the at least one calculation module are part of the predefined template.

18. The non-transitory computer-readable medium of claim 15, the operations further comprising:
storing the at least one visualization comprising the defined first visualization control, the data model, and the calculation module, as a template to be accessed by other computing devices.

19. The non-transitory computer-readable medium of claim 15, the operations further comprising:
receiving data defining a data processing application programming interface (API); and
wherein the at least one visualization comprises the first visualization control, the at least one data model, the at least one calculation module, and the data processing API.

20. The non-transitory computer-readable medium of claim 15, wherein the first visualization control is composed of multiple visual elements comprising at least two of a group comprising: a line, a rectangle, a circle, an image, scalable vector graphics (SVG) content, HTML control, a button, a slider, and a text input field.

* * * * *